United States Patent
Hermann et al.

(10) Patent No.: US 10,061,013 B2
(45) Date of Patent: Aug. 28, 2018

(54) MOBILE GUNSHOT DETECTION

(71) Applicant: Ford Global Technologies, LLC, Dearborn, MI (US)

(72) Inventors: Thomas Joseph Hermann, Troy, MI (US); Robert Bruce Kleve, Dearborn, MI (US); John Robert Van Wiemeersch, Novi, MI (US); Patrick Kevin Holub, Novi, MI (US); Michael Hrecznyj, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 586 days.

(21) Appl. No.: 14/134,032

(22) Filed: Dec. 19, 2013

(65) Prior Publication Data
US 2015/0177363 A1    Jun. 25, 2015

(51) Int. Cl.
*G01S 5/22* (2006.01)
*G01S 5/20* (2006.01)

(52) U.S. Cl.
CPC . *G01S 5/22* (2013.01); *G01S 5/20* (2013.01)

(58) Field of Classification Search
CPC ..................................... G01S 5/22; G01S 5/20
USPC .......................................................... 367/128
See application file for complete search history.

(56) References Cited

U.S. PATENT DOCUMENTS

| | | | | |
|---|---|---|---|---|
| 5,973,998 A | * | 10/1999 | Showen | G01S 5/0036 367/124 |
| 7,139,222 B1 | * | 11/2006 | Baxter | G01S 5/18 367/124 |
| 7,751,282 B2 | | 7/2010 | Holmes et al. | |
| 8,304,729 B2 | | 11/2012 | Snider et al. | |
| 2002/0003470 A1 | * | 1/2002 | Auerbach | F41H 11/00 340/425.5 |
| 2008/0165047 A1 | * | 7/2008 | Fisher | F41A 17/06 342/45 |
| 2010/0225461 A1 | * | 9/2010 | Tuli | G01S 3/8036 340/436 |
| 2010/0246328 A1 | * | 9/2010 | Gudgel | G01S 3/8083 367/127 |
| 2011/0069585 A1 | * | 3/2011 | Baxter | G01S 5/22 367/128 |
| 2012/0182837 A1 | * | 7/2012 | Calhoun | G01S 5/20 367/127 |

* cited by examiner

Primary Examiner — James R Hulka
Assistant Examiner — John T Nolan
(74) Attorney, Agent, or Firm — Frank A. MacKenzie; Bejin Bieneman PLC

(57) ABSTRACT

A first computer is configured to receive, from at least one second computer in a first vehicle, data relating to a gunshot. The computer is configured to then determine a location of the gunshot from the data, and to transmit a message, including the gunshot location, to at least one third computer in a second vehicle.

16 Claims, 5 Drawing Sheets

MOBILE GUNSHOT DETECTION

BACKGROUND

Gunshot recognition (GSR) and location systems currently exist for identifying the existence and possible location of a gunshot. Such systems may be particularly useful in urban and/or high-crime areas. A GSR system may recognize a sound signature as being associated with a gunshot, and may even be able to predict a location or general location of the gunshot. Further, a GSR system may be configured to report a gunshot and its possible location to an emergency response system. However, current GSR systems are limited in their ability to provide a precise location of a gunshot, and to provide monitoring of, and response at, such location.

DESCRIPTION

Introduction

Figure 1:
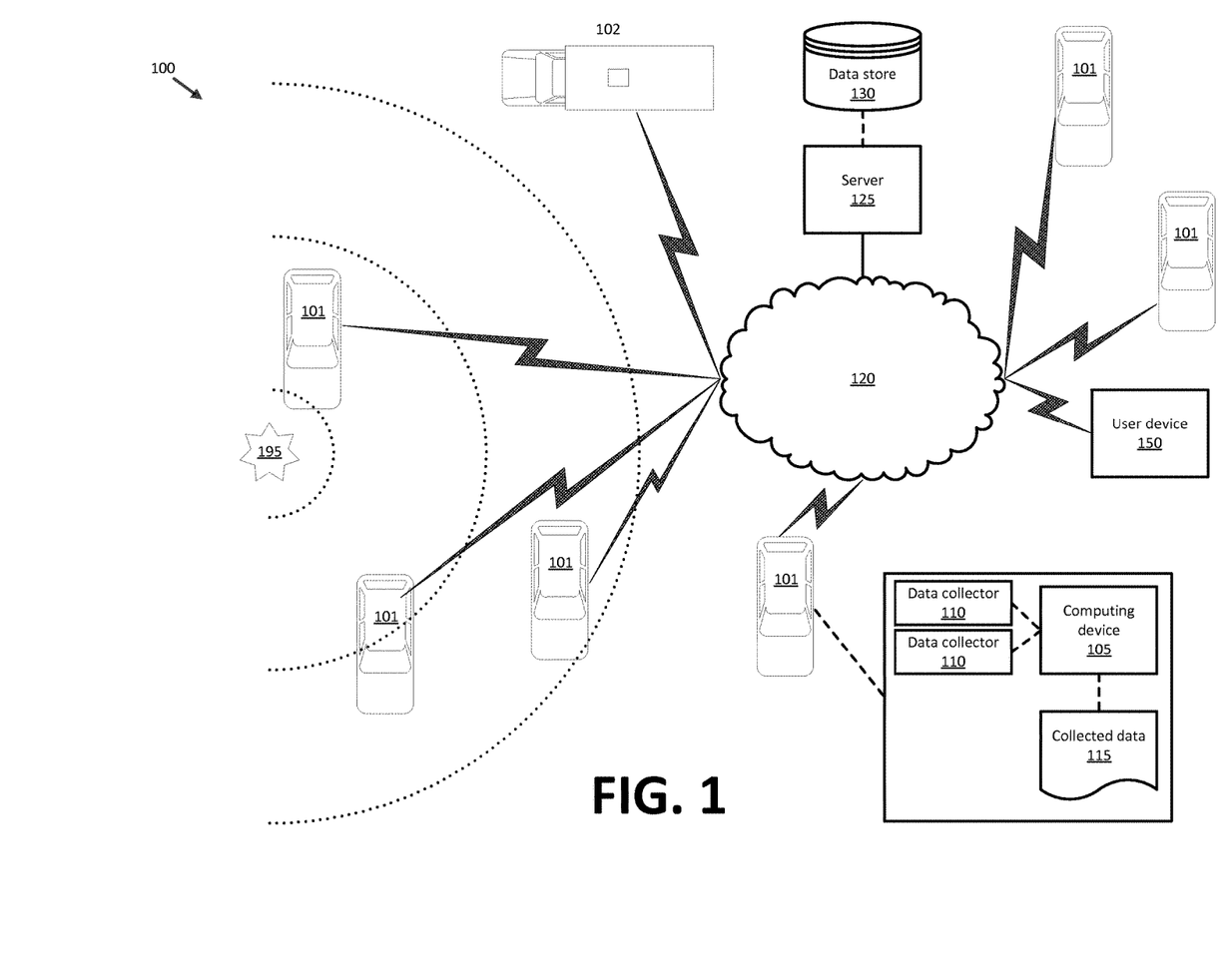
FIG. 1 is a block diagram of an exemplary gunshot detection system

FIG. 1 is a block diagram of an exemplary gunshot detection system 100. One or more vehicles 101 may be included in the system 100. Each vehicle 101 is generally provided with one or more data collectors 110 configured to obtain, and provide to the computing device 105, collected data 115. A computing device 105 generally includes instructions to evaluate collected data 115, e.g., for recognizing a gunshot. (For ease of illustration, only one vehicle 101 in FIG. 1 is shown including the elements 105, 110, 115, although these elements are generally included in every vehicle 101.)

Information relating to a detected gunshot, and other collected data 115 related to an area where a gunshot has been detected, may be provided via a network 120 to a server 125, and stored in a data store 130. The server 125 may gather collected data 115 from one or more vehicles 101 to identify or estimate a gunshot location 195. Further, the server 125 may receive collected data 115 from one or more vehicles 101 within a predefined proximity to a gunshot location 195 for a period of time. Gathering data from a group of vehicles 101 advantageously provides more information relating to, and/or a more precise determination of, the location 195 than would otherwise be possible. Moreover, the server may provide instructions to one or more vehicles 101 within a predetermined distance, e.g., radius, of a gunshot location 195, e.g., for further monitoring, gathering of collected data 115, etc. Further, the server 125 may request assistance at the gunshot location 195 from one or more emergency responders, such as an emergency vehicle 102.

Exemplary System Elements

A vehicle 101, e.g., a motorcycle, motorized bicycle or scooter, an automobile, light truck, medium or heavy-duty truck, an aircraft, a train, a bus, a watercraft, etc., includes a vehicle computer 105. A computer 105 may also be equipped at stationary locations such as in traffic control boxes, mailboxes, or other convenient locations or in a handheld nomadic device 150 such as a cellular phone, tablet, or laptop, etc. The computer 105 may include or be communicatively coupled to more than one computing device, e.g., controllers or the like included in the vehicle 101 for monitoring and/or controlling various vehicle components, e.g., an engine control unit (ECU), transmission control unit (TCU), etc.

The computer 105 generally includes instructions for evaluating collected data 110 to determine the existence of, and estimate a location 195 associated with a gunshot. Various mechanisms for interpreting a detected sound and associating an audio signature of the detected sound with a gunshot are known, and may be implemented in the computer 105. For example, mechanisms are known that utilize a bank of highly sensitive microphones arranged in a geometric pattern (a T shape, for example). The microphones may be used to detect an acoustical signature of a gunshot event, which may be used to compare intensities and timing to locate or "localize" the source of the gunshot.

Intensity of the recorded sound could vary for a given vehicle 101 due to real world factors such as the vehicle orientation, distance from a gunshot location 195, inclination, altitude, and status of vehicle closures (e.g., windows and doors). In order to compensate for potential system errors that could result in a measured audio signal level at vehicle 101 cabin microphones and/or the time of audio reception in a triangulation calculation, collected data 115 may include attributes for use in audio data compensation such as status of windows (up, down, partial open), status of doors (open, closed), compass heading (NSWE bearing), or orientation of the vehicle 101, e.g., microphone orientation relative to the gunshot location 195, 180 degrees away from the source location 195, or at other orientation angles between zero and 180. Further, the vehicle 101 inclination and altitude may play a factor in a signal level received at a microphone and a time at which the signal arrives (e.g., two vehicles 101 could be at a same GPS longitude and latitude coordinates but one vehicle 101 may be six (6) floors up in a parking structure while the second vehicle 101 is on the ground level). Similarly, for the same reasons of vertical distance from the gun source, audio sound collected from nomadic devices 150 should include GPS location data for longitude, latitude, and elevation.

Further, the system 100 may advantageously employ a novel mechanism that includes recognizing a gunshot event according to vehicle 101 sensor data collectors 110. As discussed below, a vehicle 101 may include a mechanism for estimating a gunshot location 195 based solely on collected data 115 of the vehicle 101. However, regardless of whether a vehicle 101 includes such a mechanism, the vehicle 101 may also provide data 115 to a separate computing entity, such as the cloud server 125, which could use a location, e.g., determined by a Global Positioning System (GPS) or the like, of the recognizing vehicle 101 to approximate the location 195 of the source of the gunshot event. In addition, similar information from multiple vehicles 101 in an area recognizing a same gunshot event could be used by the server 125 to improve accuracy of an approximation of a gunshot location 195, e.g., by using time stamps included in collected data 115 from various respective vehicles 101 and known triangulation techniques. Vehicles 101 that can send data 115 to a central server 125 and receive estimates of a gunshot location 195 and other information from the server 125 are referred to herein below for convenience as "Type A" vehicles 101.

Alternative or additionally, a vehicle 101 may include at least one coupled sensor array (e.g., noise cancellation microphone array) data collector 110 that can detect sound signature collected data 115. In this case, a vehicle 101 computer 105 could be configured to approximate a gunshot location 195 independently of time-stamped data 115 aggregated from the vehicle 101 and/or other vehicles 101 by the server 125. Vehicles 101 that can independently estimate a gunshot location are referred to herein below for convenience as "Type B" vehicles 101. Note that a vehicle 101 in the system 100 can be any of a Type A vehicle, a Type B vehicle, or both.

Moreover, as mentioned above, and as is required when using data 115 from Type A vehicles 101, the computer 105 and/or the server 125 may utilize a time of day at which a gunshot event was recognized to further improve accuracy of the location 195 approximation. For example, a time signature stamp may be obtained from a shared clock such as that received from GPS satellites to ensure each vehicle 101 stamps the time to a common reference. Further, the accuracy of the time stamp should have a resolution (e.g., 10 milliseconds) sufficient to map out audio reflections from the multiple locations from which a gunshot is captured to allow triangulation. For example, a vibration or pressure wave generated from a gunshot may resonate and be detected by various sensor data collectors 110 on a vehicle 101, such as an engine knock sensor, a barometric pressure sensor, or a crash accelerometer. The amplitude of such vibrations or pressure waves may be such that a gunshot event is immediately recognized.

Yet further, the server 125 and/or computer 105 may use comparisons including stored information relating to parameters of collected data 115 to identify the collected data 115 as abnormal, i.e., not likely related to a vehicle 101 system, and indeed likely a gunshot event. For example, according to stored logic and/or parameters, engine knock can be eliminated as the source of the event if the vehicle is not in a condition where engine knock would occur. For instance, engine-off, cold engine temperature, and low load are all conditions where engine knock would not occur. Similar logic can be applied to the other collected sensor data 115, for example barometric pressure would not be expected to have large changes in a short time span. Further, seeing similar anomalies on multiple sensor data collectors 110 at a same time could increase confidence in the detection.

The magnitude of collected data 115 registered by a sensor data collector 110 may be large enough to differentiate a "normal" sensor event from an "abnormal" potential gunshot event. For example, the magnitude of an acoustical event for a gunshot inside a vehicle 101 will be much greater than the events normally seen on an intrusion sensor or voice microphones. Again, note that if multiple vehicle sources receive the same event within a certain geographical proximity and time, this information can be used to further infer a gunshot event took place.

Yet another mechanism for detection of a gunshot event can include video recognition of a gun muzzle blast or other explosion. An internally facing camera data collector 110 in a vehicle 101 could recognize a flash, and the computer 105 could eliminate other potential causes with known facts such as that it is at night and it is not sun glare or the intensity and duration do not match the characteristics of a flashlight or vehicle headlight. Further if a gunshot event took place inside the vehicle the amplitude of the vibration will be so high as to indicate such an event took place inside the cabin of the vehicle.

Other systems may leverage a user's mobile device 150, e.g., connected to the computer 105 via Bluetooth or the like, including a microphone or accelerometer, etc., of a device 150 to recognize a gunshot event. Combining various recognition sources and performing logical analysis will improve the robustness of the detection methods and reduce false detections. Once recognized as a potential gunshot event, a time of an event can be recorded, and then, when multiple sources, e.g., vehicles 101, report a same event with a time phase shift, a distance to each recording source can be determined, and then an approximate location 195 of the source of the event can be determined using known mathematical techniques.

In general, when this disclosure refers to determining, identifying, etc., a location 195, it is to be understood that this means that a gunshot location 195 is approximated or estimated. That is, as will be recognized, techniques such as discussed herein, e.g., triangulation techniques, use of a sensor array as described above concerning Type B vehicles 101, etc., may have reasonable margins of error and/or provide an identification of approximation of a location 195 within a reasonable degree of certainty.

The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may be configured for communicating with the server 125, one or more devices 150, etc., via the network 120, which, as described below, may include various wired and/or wireless networking technologies, e.g., cellular, Bluetooth, wired and/or wireless packet networks, etc. Further, the computer 105, may receive and/or store collected data 115, e.g., from one or more data collectors 110 and/or a human machine interface (HMI), such as an interactive voice response (IVR) system, a graphical user interface (GUI) including a touchscreen or the like, lights and/or sound generators to provide visual and/or audio messages or alerts, etc. The computer may also provide outputs, e.g., to display messages, instructions, or the like from the server 125.

The computer 105 may store, or obtain from a data collector 110, information identifying a vehicle 101 including the computer 105. Further, the computer 105 may store information identifying a security group or groups to which the vehicle 101 belongs. A vehicle 101 group may include a common identifier that may be communicated to a server 125 along with a unique or substantially unique identifier for a vehicle 101, e.g., a vehicle identification number (VIN). A vehicle 101 group may include vehicles 101 part of a fleet, e.g., a police department, a taxi or livery fleet, a rental car fleet, a citizens safety group, etc.

Data collectors 110 may include a variety of devices, including audio and visual sensors such as microphones, cameras, and the like. Further, various controllers and/or sensors in a vehicle may operate as data collectors 110 to provide data 115 via the CAN bus, e.g., data 115 relating to detected sounds, images, vehicle speed, acceleration, etc. data identifying a vehicle 101, e.g., a vehicle identification number (VIN) or the like, etc. Further, sensors or the like, global positioning system (GPS) equipment, etc., could be included in a vehicle and configured as data collectors 110 to provide data directly to the computer 105, e.g., via a wired or wireless connection.

In particular, data collectors 110 may be included in the vehicle 101 and/or configured for gunshot detection. Examples of data collectors 110, and collected data 115 that could be provided by respective data collectors 110 for use in gunshot detection, are provided in table 1 below:

TABLE 1

| Exemplary Data Collector 110 | Exemplary Collected Data 115 |
| --- | --- |
| Microphones (possibly active noise canceling) | Vibration frequency and amplitude |
| Accelerometer | Acceleration or deceleration that could be associated with a gunshot |
| Vehicle intrusion detector | Changes in sound pressure levels. Orientation of vehicle (tilted up or down) |
| Vehicle interior camera | Flash of high intensity light registered (indicating possible in-cabin gunshot) |
| Sensors on a user's personal mobile device that is connected to the vehicle over | Accelerometer or microphone recorded high intensity event. |
| Engine knock sensor | Voltage indicative of vibration associated with detonation |
| Engine barometric pressure sensor | Detect pressure change pattern associated with gunshot |
| Window Status (Open or Closed) | To compensate for received microphone signal levels for attenuation from closed window(s) |
| Vehicle Heading/Orientation via Dead Reckoning or Compass | To compensate for received microphone signal levels for direction relative to sound source |
| Elevation of the Vehicle via GPS | To compensate for received microphone signal levels between recording locations for the height of the microphone |
| Audio System Status and Volume Level | To compensate for received microphone signal levels for reduced signal to noise ratio due to ambient sound. |

A memory of the computer 105 generally stores collected data 115, in a memory and/or buffer, e.g., a buffer may store audio and/or image data for a period of time, e.g., 30 seconds, one minute, five minutes, etc., and/or may transmit collected data 115 from the memory or buffer, or in substantially real-time, to the server 125. Collected data 115 may include a variety of data collected in a vehicle 101 from data collectors 110 and/or stored in a computer 105 memory, e.g., sounds and/or images obtained by one or more data collectors 110, geo-coordinates or other information providing a location of the vehicle 101, vehicle 101 identifying information such as a VIN, license plate number, or the like, etc. The vehicle 101, e.g., the computer 105, may be configured to take special action to enable or disable the data collectors 110 to preserve battery charge. Non-limiting examples are that the vehicle 101 may recognize that a present geo-location of the vehicle 101 is in a dangerous area such as near an automated teller machine (ATM) or night cash drop, and could enable the data collectors 110, or a user may manually enable them if concerned about a geographic area. Or, the vehicle 101 may enable data collectors 110 based on historical records of past gunshot activity as recorded in data store 130 and/or FBI or Municipal databases. Another example may activate data collectors when a police vehicle is detected in pursuit of a suspect or on its way to a crime, accident, or other emergency scene, e.g., as determined by speed or siren activation.

Examples of data 115 are provided above, and moreover, data 115 may include data calculated or derived therefrom in the computer 105. For example, collected image data 115 could be subjected to an optical character recognition (OCR) process, e.g., to provide information relating to street signs, license plate numbers, photographs or images of possible gunshot perpetrators, etc. In general, collected data 115 may include any data that may be gathered by a collection device 110 and/or computed from such data. Accordingly, collected data 115 could include a variety of data related to vehicle 101 location, operations and/or performance, as well as data related to an environment proximate to the vehicle 101. The computer 105 may further be configured to improve quality of the data 115 collected by data collectors 110. For example, the computer 105 may activate interior or exterior vehicle 101 lights to better illuminate an area or areas monitored by an image collecting device 110, or the computer 105 may deactivate a vehicle 101 speakers to allow microphone data collectors 110 to better collect audio data 110.

The network 120 depicted in FIG. 1 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing data 115 uploaded from one or more vehicle 101 computers 105, etc.

A user device 150 may be any one of a variety of computing devices including a processor and a memory, as well as communication capabilities. For example, the user device 150 may be a portable computer, tablet computer, a smart phone, etc., that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Process Flows

Figure 2:
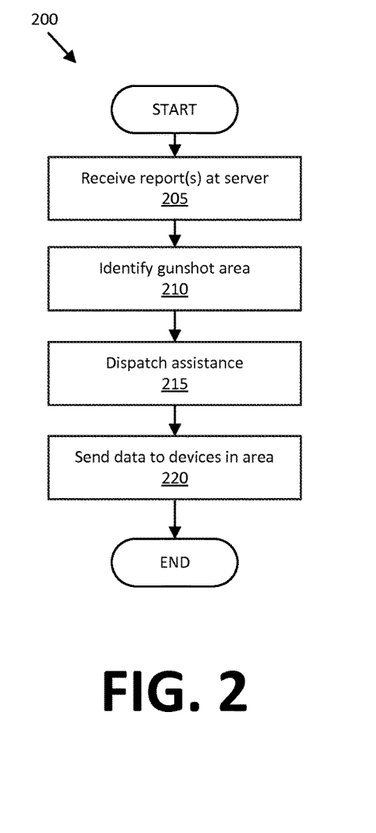
FIG. 2 is a diagram of an exemplary process for a server to manage gunshot recognition data.

FIG. 2 is a diagram of an exemplary process 200 for a server 125 to manage gunshot recognition data. The process 200 begins in a block 205, in which a server 125 receives a report from a vehicle 101, nomadic device 150, or stationary monitoring location that a gunshot has been detected. Such communication may be in the form of data packets sent via the network 120. The report may include a vehicle 101 location (e.g., using geo-coordinates or the like) or device 150 location. Further, a vehicle 101 may communicate to the server a VIN or other unique or substantially unique vehicle 101 identifier, and, if applicable, an identifier for a security group to which the vehicle 101 belongs. Further, a report from a vehicle 101 generally includes sound intensity and other data, along with a timestamp relating to sound data, indicating a gunshot.

Next, in a block 210, the server 125 determines a gunshot location 195 and identifies an area of a detected gunshot around the gunshot location 195. For example, an area may be a predetermined radius, e.g., 100 yards, one quarter mile, etc., around a gunshot location 195. Further, a gunshot area identified by the server 125 could be dependent on geo-coordinates of a gunshot location 195. For example, the size of a gunshot area could be varied according to population and/or building density of an urban area, e.g., smaller in more dense areas. The gunshot location 195 may be determined according to known triangulation methods, e.g., comparing geo-coordinates of various vehicles 101 reporting the gunshot, sound intensities recorded by the respective vehicles 101, and timestamps associated with sounds recorded by respective vehicles 101.

Next, in a block 215, the server 125 may dispatch assistance, e.g., police assistance, emergency medical assistance, etc., to a gunshot location 195 identified in the message of the block 205. For example, the server 125 may be configured to access a 911 service or the like to provide a request for police and/or medical assistance at a gunshot location 195. To provide such request, the server 125 may be further configured to determine a street address from geo-coordinates of a gunshot location 195.

Next, in a block 220, the server 125 generally sends data, instructions, and the like to vehicles 101 in the gunshot area determined in the block 210. For example, the server 125 could broadcast a message to vehicles 101 in a security group that a gunshot had been detected at the gunshot location 195. Further, the server 125 could request that vehicles 101 in the gunshot area obtain collected data 115 and provide such collected data 115 to the server 125. The collected data 115 could include audio and/or images from microphone and/or camera data collectors 110 on one or more vehicles 101, and could be used for, tracking gunshot perpetrators, as evidence relating to a gunshot, and other law enforcement purposes. Further, the server 124 or a dispatcher could send commands to wireless traffic controllers to block traffic (e.g., change certain traffic lights to red) from entering a region within a predefined radius of the gunshot location 195 until there is an "all clear" from first responders.

Moreover, as described below, computers 105 may include a memory and/or buffer storing collected data 115 that could be relevant to a gunshot. Accordingly, a request from a server 125 could include a request for buffered data 115 stored by a computer 105 prior to, during, and immediately after gunshot event. For example, recorded sounds and/or images could provide evidence showing or otherwise related to a gunshot perpetrator, i.e., a shooter of a gun.

Further, information sent by the server 125 in the block 220 could include instructions or directions for a vehicle 101 to exit a gunshot area. That is, an occupant of a vehicle 101 would likely desire to leave a location proximate to a gunshot location 195. Therefore, the server 125 could compare the gunshot location 195 to possible escape routes, e.g., major roads, roads with traffic conditions allowing passage, etc., to recommend a route to vehicles 101 in the gunshot area.

Following the block 220, the process 200 ends.

Figure 3:
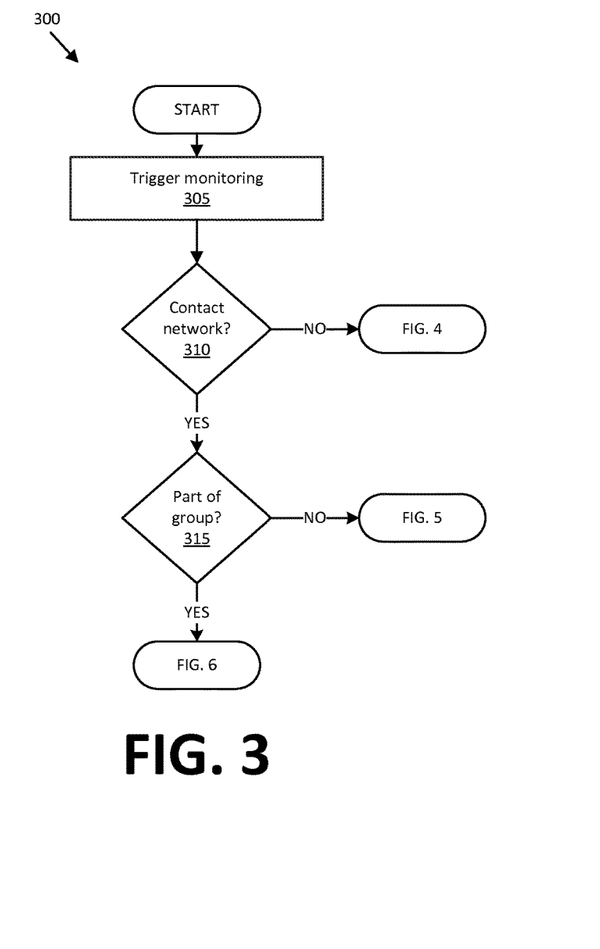
FIG. 3 is a diagram of an exemplary process for gunshot detection in a vehicle.

FIG. 3 is a diagram of an exemplary process 300 for gunshot detection in a vehicle 101. The process 300 begins in a block 305, in which the computer 105 triggers gunshot detection monitoring. A gunshot monitor trigger could include one or more events in a vehicle 101. The purpose of the gunshot monitor trigger is generally to ensure that the computer 105 is not operating to monitor for gunshots when a vehicle 101 is not operating, thereby avoiding unnecessary or undesirable drains on a vehicle 101 battery. An example of a gunshot monitor trigger would be powering on of a vehicle 101 engine, which could be detected by communications on a CAN bus, by audio detection of a vehicle 101 engine, vehicle anti-theft motion detectors, etc.

Next, in a block 310, the computer 105 determines whether it is configured to, or can, contact the network 120. If not, then the process 300 transitions to the process 400 of FIG. 4. If the network 120 can be contacted, then the process 300 proceeds to a block 315.

In the block 315, which may follow the block 310, the computer 105 determines whether the vehicle 101 that includes the computer 105 is part of a security group. If not, the process 300 transitions to the process 500 of FIG. 5. If the vehicle 101 is part of a security group, then the process 300 transitions to the process 600 of FIG. 6.

Figure 4:
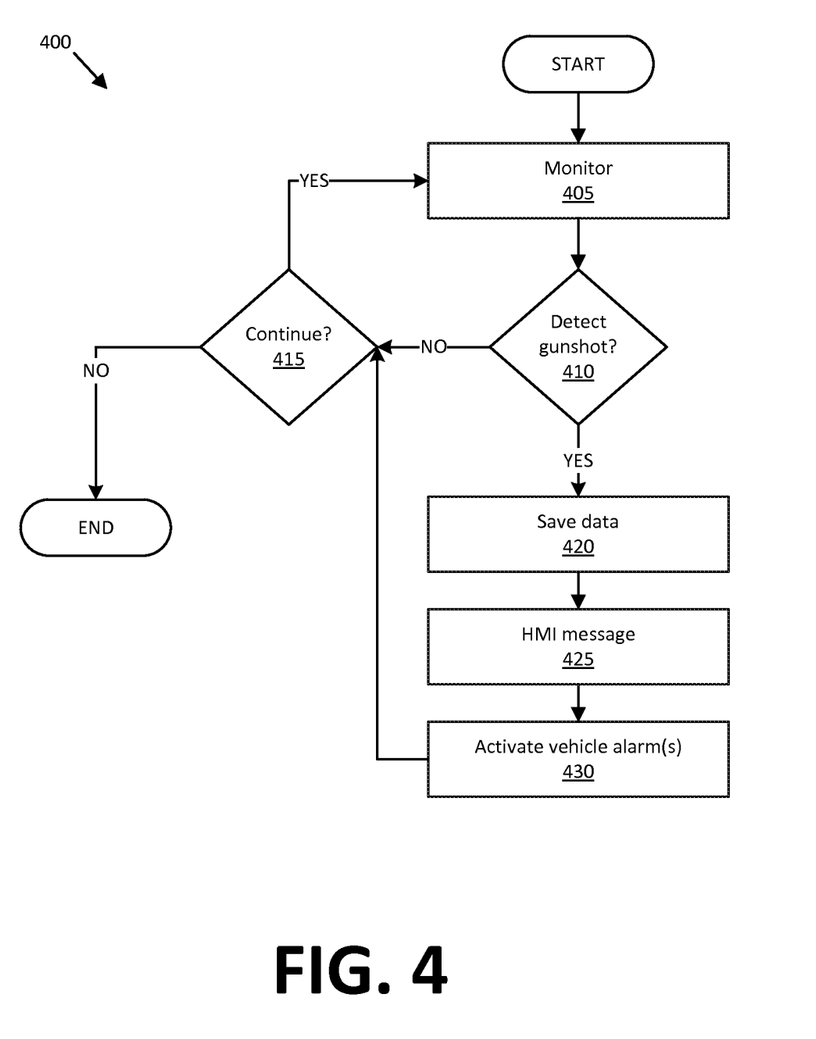
FIG. 4 is a diagram of an exemplary process for gunshot detection in a vehicle without network connectivity.

FIG. 4 is a diagram of an exemplary process 400 for gunshot detection in a vehicle 101 without network 120 connectivity. The process 400 begins in a block 405, in which the computer 105 performs monitoring to detect gunshots. As noted above, various known mechanisms for detecting gunshots and a gunshot location 195 exist and could be implemented in the computer 105 as well as novel mechanisms disclosed herein, e.g., video recognition of a gun-flash, or vibration threshold exceeded on an engine knock sensor, vehicle 101 microphone, barometric pressure sensor, etc., as described previously. Such mechanisms and/or other mechanisms could use collected data 115 obtained from data collectors 110 present in the vehicle 101. In general, together with situational awareness and logical conditions can be used to infer that a likely gunshot event occurring, e.g., vehicle 101 is at idle and therefore no engine knock is present.

Next, in a block 410, the computer 105 determines whether a gunshot has been detected as described with respect to the block 405. Further, the computer 105 may also determine, according to known methods, whether the gunshot is detected to have occurred inside a vehicle 101 cabin or outside the vehicle 101. Yet further, known methods may be used, if the vehicle 101 is a Type B vehicle 101 such as discussed above, to estimate a distance from the vehicle 101 and/or location 195 of the gunshot. In any case, if a gunshot has been detected, the process 400 proceeds to a block 420. If not, the process 400 proceeds to a block 415.

In the block 415, the computer 105 determines whether the process 400 should be continued. For example, a vehicle 101 engine may be powered off, a user may provide input, e.g., via an HMI of the computer 105, to stop gunshot monitoring, etc. In any case, if the process 400 should not continue, then the process 400 ends following the block 415. Otherwise, the process 400 returns to the block 405 following the block 415.

In the block 420, which may follow the block 410, the computer 105 saves collected data 115 that has been stored in a memory or buffer of the computer 105 relating to gunshot detection. For example, as mentioned above, a computer 105 buffer could include interior or exterior image and/or sound data 115 and/or other data 115, examples of which are provided above in Table 1, relating to gunshot detection. A computer 105 in a type B vehicle 101 could further store an identified gunshot location 105.

In any event, in the block 420, the computer 105 could save such data 115 so that it is not lost when a buffer or portion of a memory is over-written. Further, the computer 105 could continue to record and store data 115 relating to gunshot detection once a gunshot had been detected to the extent permitted by computer 105 memory. Moreover, as described below, although the process 400 contemplates that the computer 105 does not employ network 120 connectivity, in instances where the computer 105 can communicate with the server via the network 120, the computer could initiate a streaming of data 115 to the server 125 upon detecting a gunshot, or the computer 105 may save buffer data 115 in memory for physical extraction or download later by the appropriate authorized user or for transmission to the server 125 if the computer 105 experiences network 120 connectivity at a later time. If the vehicle 101 without connectivity has "WiFi" or the like, but is not equipped with an embedded modem or connected user device 150, the vehicle 101 could attempt to connect via WiFi with other designated vehicles 101 which may have an embedded modem.

In the block 425, the computer 105 displays a message to a vehicle 101 occupant, e.g., via an HMI of the vehicle, via a device 150 communicating with the computer 105, e.g., via Bluetooth, etc. The HMI message may inform the vehicle 101 occupant that a gunshot has been detected, and may also provide the vehicle 101 occupant with an opportunity to indicate that the detected gunshot should be ignored. For example, the vehicle 101 occupant may be aware that a gunshot-like sound is not in fact a gunshot. Thus, although not shown in FIG. 4, the process 400 could be aborted, i.e., ended, following such input in the block 425. The HMI message could provide other information. For example, the computer 105 in a Type B vehicle could estimate a gunshot location 195 using known algorithms, and further could indicate the location 195 via the HMI, or show graphically the location 195, images of the event or assailant, instructions, etc. The computer 105 could also, via the HMI, indicate routes away from the location 195. Likewise, the computer 105 in a Type A vehicle 101 could store images, sounds, or the like from vehicle 101 data collectors 101; even if a gunshot location 195 is not determined, data 110 stored by a vehicle 101 proximate to the gunshot location could be useful, e.g., for law enforcement investigation.

Next, in a block 430, the computer 105 may cause various signaling devices and/or alarms in the vehicle 101 to be activated. For example, if a gunshot has been detected inside a vehicle 101, cabin lights in the vehicle 101 may be activated, the vehicle 101 horn may be honked, headlamps may be flashed, hazard lights may be activated, etc. Some or all of such actions, or other actions, may be taken if a gunshot has been detected outside a vehicle 101. However, signals and/or alarms where a gunshot has occurred outside a vehicle 101 may be different from alarms when the gunshot occurred inside a vehicle 101, that is, for a gunshot outside a vehicle 101 and alarm noise, illuminating lights inside a vehicle 101 cabin, etc., may be more appropriate, and alarm mechanisms such as flashing headlamps, hazard lights, etc. outside a vehicle 101 may be less appropriate.

Following the block 430, the process 400 returns to the block 415.

Figure 5:
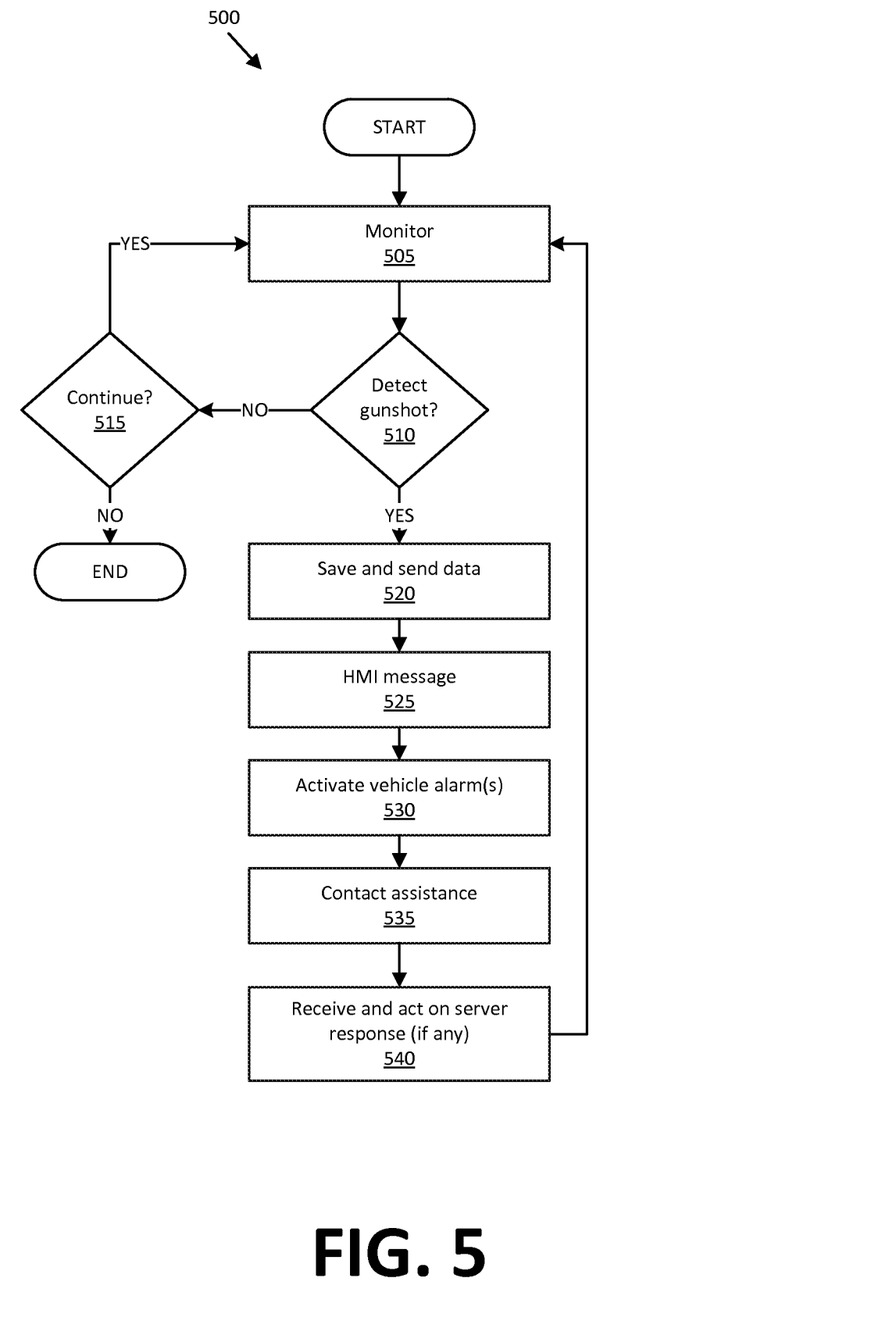
FIG. 5 is a diagram of an exemplary process for gunshot detection in a vehicle having network connectivity.

FIG. 5 is a diagram of an exemplary process 500 for gunshot detection in a vehicle 101 having network 120 connectivity. The process 500 begins with blocks 505-530 that are similar to blocks 405-430 discussed above. However, the process 500 contemplates that the computer 105 has connectivity to the server 125, and therefore, in the block 520, data 115 is generally sent to the server 125, and moreover, a stream of data 115 from the vehicle 101, or regular transmission of data 115 from the vehicle 101, may be established. Such data stream or regular transmission of data 115 may be continued for a predetermined period of time, e.g., 15 minutes, 30 minutes, etc., or may continue until the process 500 is terminated.

The block 535 may follow the activation of vehicle alarms and/or signals in the block 530. In the block 535, the computer 105 may contact an emergency service provider, e.g., call 911, or the like as part of such contact, the vehicle 101 may provide a location, e.g., geo-coordinates, of the vehicle 101, as well as an indication of whether a gunshot occurred inside or outside of the vehicle 101, and/or, if a Type B vehicle 101, an estimated gunshot location 195.

Next, in a block 540, the computer 101 may receive instructions and/or data from the server 125 as described above. Further, the computer 105 may implement such instructions, e.g., for a Type B vehicle that has estimated a gunshot location 195, display a recommended escape route from a gunshot area recommended by the server 125. Moreover, the computer 105 could initiate voice communications with a data center associated with the server 125, with an emergency service such as a 911 service, etc. Such voice communications could allow an occupant of the vehicle 101 to request assistance, to provide information about a gunshot incident, etc. Following the block 540, the process 500 returns to the block 505.

Figure 6:
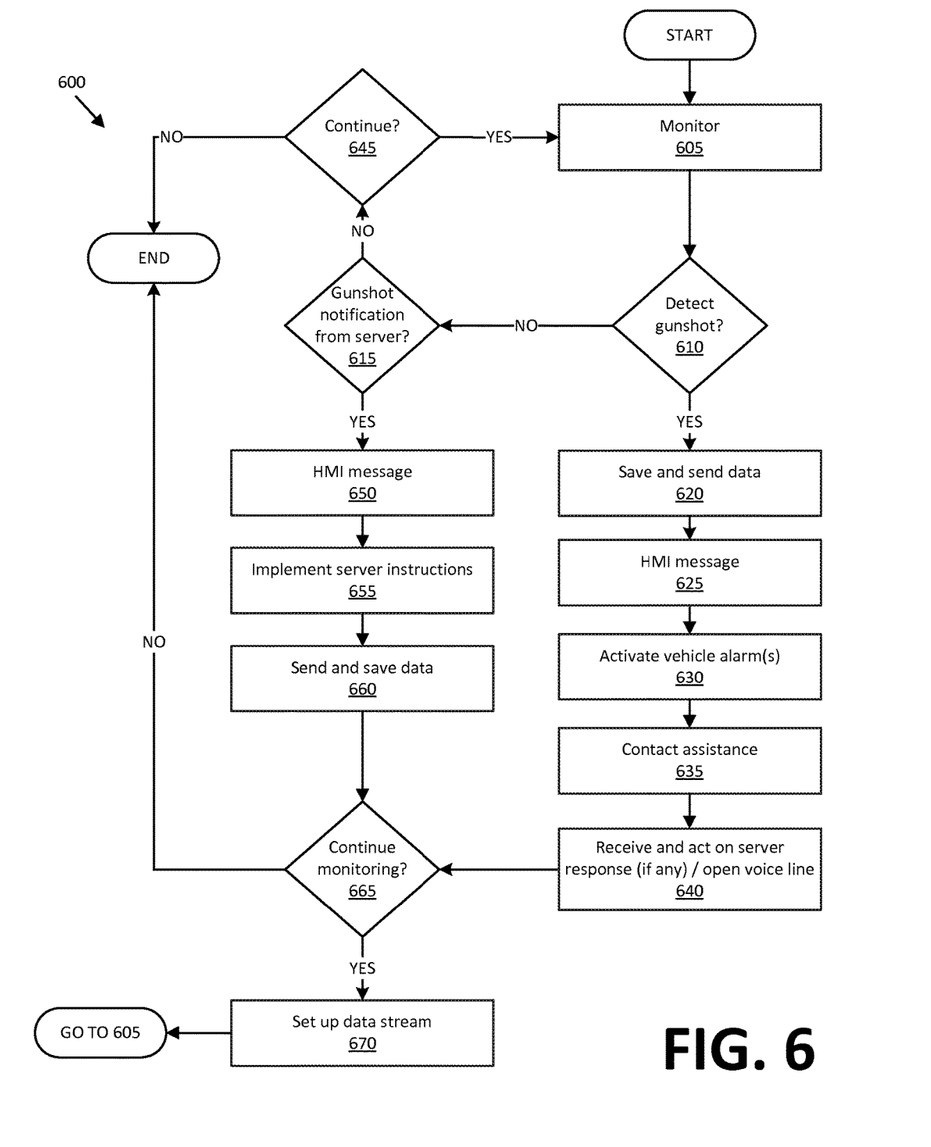
FIG. 6 is a diagram of an exemplary process for gunshot detection in a vehicle that has network connectivity and that is part of a vehicle group.

FIG. 6 is a diagram of an exemplary process for gunshot detection in a vehicle 101 that has network 120 connectivity and that is part of a vehicle 101 group. The process 600 begins in a block 605, followed by a block 610, the blocks 605, 610 being similar to the blocks 405, 410 and 505, 510, described above.

If a computer 105 detects a gunshot as determined in the block 610, blocks 620-640 may be executed in a manner similar to the blocks 520-540. Further, in the block 640, the computer 105 could initiate voice communications such as described above with respect to the block 540. Following the block 640, the process 600 proceeds to a block 665, discussed below.

A block 615 may follow the block 610 if the computer 105 has not detected a gunshot. In the block 615, the computer 105 determines whether a gunshot notification has been received from the server 125. Recall that the process 600 contemplates that the vehicle 101 is part of a security group identified by the server 125. Further, as described above with respect to the process 200, the server 125 could, upon receiving a report of a gunshot and determining a gunshot location 195 and an area around a vehicle 101, transmit information concerning the gunshot to one or more vehicles 101 in a security group, including information relating a location of the vehicle 101 providing data 115, a time stamp as discussed above, etc. In any event, if a gunshot notification is received from the server 125, a block 650 is executed next. Otherwise, the process 600 proceeds to a block 645.

In the block 645, much like the blocks 415, 515 discussed above, the computer 105 determines whether the process 600 should continue. If not, the process 600 ends. Otherwise, the process 600 returns to a block 605.

In the block 650, which may follow the block 615, the computer 105 may display a message on an HMI relating to the gunshot notification received from the server 125. Further, a vehicle 101 occupant may have an option to ignore a gunshot notification and/or an option to opt out of participating in a safety group and/or receiving and/or following instructions from the server 125, in which cases the process 600, although not depicted as such in FIG. 6, could terminate. Yet further, the HMI could display possible routes for exiting a gunshot area and/or other information about a gunshot event. The vehicle 101 may also record descriptions of the event, associated data such as license plate characters, suspect or event descriptions or images, suspect vehicle images or descriptions etc. for improved response by group members.

In a block 655, the computer 105 may implement instructions received from the server 125. For example, the server 125 could request certain collected data 115 from the computer 105, e.g., image and/or sound data of a gunshot area available to the vehicle 101.

Next, in a block 660, the computer 105 sends data 115 to the server 125, e.g., data 115 requested by the server 125, data 115 specified in instructions of the computer 105 to be provided upon notification of the gunshot event, etc. Further, data 115 identified as relevant to a gunshot event may be saved in a memory of the computer 105, buffer over-writing may be suspended, etc.

Next, in a block 665, the computer 105 determines whether monitoring of an area around the vehicle 101 should continue. For example, the server 125 may not have requested continuous monitoring, the computer 105 may not be configured to automatically continuously monitor, a user may have terminated monitoring, etc. if monitoring should not continue, then the process 600 ends. Otherwise, the process 600 proceeds to a block 670.

In the block 670, the computer 105 establishes a data stream and/or periodic reporting of data 115 to the server 125. Then the process 600 returns to a block 605.

It should be noted that, with respect to the processes 300, 400, 500, and 600, that some or all of the operations ascribed to the server 125 could be performed by a designated vehicle 101 computer 105. For example, a police vehicle 101 or the like could include a computer 105 designated to perform operations of the server 125 for a vehicle 101 safety group. Thus, computers 105 in a safety group could be configured to report gunshots and other collected data 115 to the designated "server node" computer 105. Alternative or additionally, the network 120, or perhaps the server 125, could be configured to route communications from computers 105 in a safety group to a designated server node computer. Likewise, the server node computer 105 could include instructions for communicating with other computers 105 in the safety group, determining a gunshot location 195, providing instructions to other computers 105 concerning gathering additional data 115, routes of escape from a gunshot area, etc.

CONCLUSION

Computing devices such as those discussed herein generally each include a processor and a memory, the memory including one or more forms of computer-readable media, and storing instructions executable by the processor for performing various operations, including as disclosed herein. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a first computer that comprises a processor and a memory and is configured to:
    receive, from a second computer in a first vehicle, data relating to a gunshot detected by one or more sensors in the first vehicle, wherein the data includes at least first vehicle location sensor data, sound sensor data, and data from at least one additional vehicle sensor; wherein the at least one additional vehicle sensor includes at least one of a vehicle intrusion detector, an interior camera, an engine knock sensor, an engine pressure sensor, and a window status sensor;
    determine a location of the gunshot from the data; and
    transmit a message, including the gunshot location, to a second vehicle.

2. The system of claim 1, wherein the first computer is in a third vehicle.

3. The system of claim 1, wherein the second computer is one of a plurality of second computers, each in a respective second vehicle, and data related to the gunshot is received from each of the second computers in the respective second vehicles.

4. The system of claim 1, wherein determining a location of the gunshot from the data includes comparing time-stamps associated with the gunshot, each of the time-stamps being received from one of the second computers.

5. The system of claim 1, wherein the second vehicle is a plurality of second vehicles.

6. The system of claim 1, wherein the message includes a route based on a location of the second vehicle and the gunshot location.

7. The system of claim 1, wherein the first computer is further configured to place a call identifying the gunshot location to an emergency service provider.

8. A system, comprising a computer in a first vehicle that comprises a processor and a memory and is configured to:
    detect a gunshot fired outside the first vehicle;
    transmit data concerning the gunshot to a remote computer, wherein the data is data detected by one or more sensors in a second vehicle and includes at least second vehicle location sensor data, sound sensor data, and data from at least one additional vehicle sensor; wherein the at least one additional vehicle sensor includes at least one of a vehicle intrusion detector, an interior camera, an engine knock sensor, an engine pressure sensor, and a window status sensor; and
    receive a message from the remote computer identifying a location of the gunshot.

9. The system of claim 8, wherein the remote computer is in thea second vehicle.

10. The system of claim 8, further comprising a computer in a second vehicle that comprises a processor and a memory and is configured to:
    detect the gunshot;
    transmit data concerning the gunshot to the remote computer; and
    receive a second message from the remote computer identifying the location of the gunshot.

11. The system of claim 8, further comprising a computer in a second vehicle that comprises a processor and a memory and is configured to receive a second message from the remote computer identifying the location of the gunshot.

12. The system of claim 8, wherein the remote computer is in a stationary location.

13. The system of claim 8, wherein the computer in the first vehicle is further configured to place a call identifying the gunshot location to an emergency service provider.

14. The system of claim 8, wherein the message includes a route based on a location of the second vehicle and the gunshot location.

15. A method, comprising:
    receiving, in a first computer, from a second computer in a first vehicle, data relating to a gunshot detected by one or more sensors in the first vehicle, wherein the data includes at least first vehicle location sensor data, sound sensor data, and data from at least one additional vehicle sensor; wherein the at least one additional vehicle sensor includes at least one of, a vehicle intrusion detector, an interior camera, an engine knock sensor, an engine pressure sensor, and a window status sensor;
    determining a location of the gunshot from the data; and
    transmitting a message, including the gunshot location, to a second vehicle.

16. The method of claim 15, wherein the message includes a route based on a location of the second vehicle and the gunshot location.

* * * * *